(12) United States Patent
Shin

(10) Patent No.: US 7,047,410 B1
(45) Date of Patent: May 16, 2006

(54) DIGITAL IMAGE WATERMARKING METHOD

(75) Inventor: Hyun-doo Shin, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/572,435

(22) Filed: May 17, 2000

Related U.S. Application Data

(60) Provisional application No. 60/134,549, filed on May 17, 1999.

(51) Int. Cl.
*H04L 9/00* (2006.01)

(52) U.S. Cl. .................................... 713/176; 713/180

(58) Field of Classification Search ............... 380/54, 380/51; 713/176, 180
See application file for complete search history.

(56) References Cited

U.S. PATENT DOCUMENTS

| | | | | |
|---|---|---|---|---|
| 5,825,892 A | * | 10/1998 | Braudaway et al. | .......... 380/51 |
| 6,185,312 B1 | * | 2/2001 | Nakamura et al. | .......... 382/100 |
| 6,332,030 B1 | * | 12/2001 | Manjunath et al. | ......... 382/100 |

FOREIGN PATENT DOCUMENTS

| | | |
|---|---|---|
| EP | 0 891 071 | 1/1999 |
| JP | 10-276321 | 10/1998 |
| JP | 11-65440 | 3/1999 |
| JP | 11-65444 | 3/1999 |
| JP | 11-136494 | 5/1999 |
| JP | 11-239129 | 8/1999 |
| JP | 11-341268 | 12/1999 |

OTHER PUBLICATIONS

J. J. Chae et al., "Color Image Embedding using Multidimensional Lattice Structures", Proceedings of the 1998 International Conference on Image Processing, ICIP '98, vol. 1, conf. 5, Oct. 1998, pp. 460-464.

J. J. Chae et al., "A Robust Data Hiding Technique using Multidimensional Lattices", Research and Technology Advances in Digital Libraries, Apr. 22, 1998, pp. 319-326.

(Continued)

*Primary Examiner*—Gilberto Barron, Jr.
*Assistant Examiner*—G. Gurshman
(74) *Attorney, Agent, or Firm*—Sughrue Mion, PLLC

(57) ABSTRACT

A digital image watermarking method is provided. The digital image watermarking method includes the steps of combining host image data sets and signature image data sets by a predetermined method for combining the sets to be linearly independent, and generating a watermarked image and a key from the combined image. A signature image embedded in a combined image is similar to the combined image in view of existence and durability.

35 Claims, 3 Drawing Sheets

OTHER PUBLICATIONS

H. Inoue et al., "A Digital Watermark Based on the Wavelet Transform and its Robustness on Image Compression", Proceedings of the 1998 International Conference on Image Processing, ICIP '98, vol. 2, conf. 5, Oct. 1998, pp. 391-395.

H. Wang, et al., "Image Protection Via Watermarking on Perceptually Significant Wavelet Coefficients", Multimedia Signal Processing, Dec. 7, 1998, pp. 279-284.

J. Kim, et al., "A Robust Wavelet-Based Digital Watermarking Using Level-Adaptive Thresholding", Image Processing, Oct. 24, 1999, pp. 226-230.

Japanese Office Action dated Dec. 14, 2005.

ITE Technical Report vol. 21, No. 42, pp. 1-5, MIP' 97-36, NIM 97-55 (Jul., 1997).

* cited by examiner

DIGITAL IMAGE WATERMARKING METHOD

This application claims benefit of Provisional Application No. 60/134,549 filed May 17, 1999.

BACKGROUND OF THE INVENTION

1. Field of the Invention

The present invention relates to watermarking, and more particularly, to a digital image watermarking method.

2. Description of the Related Art

Digital watermarking is a technique of embedding a bit pattern, which is referred to as signature information, in a digital image or audio and video files to identify the image or files as copyright information. That is to say, digital watermarking can be used for the purpose of providing copyright protection. In the case where copyright material is based on video contents, the digital watermarking is devised such that the signature information is invisible. In the case where copyright material is based on audio contents, the digital watermarking is devised such that the signature information is inaudible. Also, the signature information must be evenly spread throughout an original file so as not to be identified or manipulated by users. Further, the signature information must be robust enough to withstand general changes made to the original file, for example, reduction due to a compression algorithm.

FIG. 1 illustrates a conventional digital image watermarking method. Referring to FIG. 1, in the conventional digital image watermarking method, a host image and a signature image are transformed into Fourier coefficients by fast fourier transform (FFT), and not only coefficients of the transformed signature image but also a password or key for mixing are attached to a high frequency portion of a coefficient spatial domain of the transformed host image, thereby performing watermarking. Now, the watermarked image is separated into host image coefficients and signature image coefficients using a password or key for separation. Next, the separated coefficients are inverse fast fourier transformed (IFFT), thereby obtaining a host image and a signature image, respectively.

Also, according to another conventional digital watermarking method, a signature image and a host image are transformed into wavelet coefficients by discrete wavelet transform (DWT), and the wavelet coefficients of the signature image are attached to a wavelet spatial domain of the transformed host image, thereby performing watermarking.

However, according to the conventional watermarking methods, since the arrangement of signature image coefficients embedded in the host image coefficients is based on the arithmetic sum of two coefficients at each pixel point, the arrangement robustness cannot be ensured. That is to say, if a combined image undergoes severe image processing for altering the image, e.g., image compression, the arithmetic sum may be changed so severely that one type of data cannot be separated from another type of data. Similarly, if a combined image undergoes mild image processing two or more times, the arithmetic sum may also be changed so severely that one type of data cannot be separated from another type of data.

SUMMARY OF THE INVENTION

It is a first object of the present invention to provide a digital image watermarking method for performing watermarking such that a signature image embedded in a combined image is similar to the combined image in view of existence and durability.

It is a second object of the present invention to provide a digital image encoding method including the digital image watermarking method.

It is a third object of the present invention to provide a computer readable recording medium for storing program codes for performing the digital image watermarking method.

It is a fourth object of the present invention to provide a digital image decoding method for decoding the image encoded by the digital image encoding method.

It is a fifth object of the present invention to provide a digital image watermarking processor for performing watermarking such that a signature image embedded in a combined image is similar to the combined image in view of existence and durability.

It is a sixth object of the present invention to provide a digital image encoding apparatus including the digital image watermarking processor.

It is a seventh object of the present invention to provide a digital image decoding apparatus for decoding the image encoded by the digital image encoding method.

Accordingly, to achieve the first object, there is provided a digital image watermarking method including the steps of combining host image data sets and signature image data sets by a predetermined method for combining the sets to be linearly independent, and generating a watermarked image and a key from the combined image.

Also, the digital image watermarking method may further include the step of extracting a signature image from the watermarked image using the key.

According to another aspect of the present invention, there is provided a digital image watermarking method including the steps of (a) padding with predetermined pixel values between the respective data in the signature image data sets such that the size of a signature image data set is the same as that of a host image data set, (b) setting the padded signature image data sets as wavelet coefficient sets of wavelet functions, (c) setting the host image data sets as scaling coefficient sets of scaling functions, and (d) reconstructing the wavelet coefficient sets and the scaling coefficient sets as scaling coefficient sets at one level higher than the level to which the two sets belong, in accordance with a predetermined wavelet reconstruction algorithm in which the wavelet coefficient sets and the scaling coefficient sets are linearly independently arranged.

Preferably, the predetermined pixel values are zeros.

Also, the predetermined wavelet reconstruction algorithm may include the step of alternately arranging coefficients of the wavelet coefficient sets and coefficients of the scaling coefficient sets.

Also, the digital image watermarking method may further include the step of (e) generating a watermarked image and a key from the reconstructed scaling coefficient sets.

Preferably, the digital image watermarking method further includes the step of (f) extracting a signature image from the watermarked image using the key.

To accomplish the second object, there is provided digital image encoding method including the digital image watermarking method.

To accomplish the third object, there is provided a computer-readable recording medium for storing program codes for performing a digital image watermarking method including the steps of (a) padding with predetermined pixel values between the respective data in the signature image data sets such that the size of a signature image data set is the same as that of a host image data set, (b) setting the padded signature image data sets as wavelet coefficient sets of wavelet functions, (c) setting the host image data sets as scaling coefficient sets of scaling functions, and (d) reconstructing the wavelet coefficient sets and the scaling coefficient sets as scaling coefficient sets at one level higher than the level to which the two sets belong, in accordance with a predetermined wavelet reconstruction algorithm in which the wavelet coefficient sets and the scaling coefficient sets are linearly independently arranged.

To accomplish the fourth object, there is provided a digital image decoding method for decoding an image encoded by a digital image encoding method including the step of performing a digital image watermarking method for combining host image data sets and signature image data sets in a predetermined combination method by which the host image data sets and the signature image data sets are linearly independently combined, and for generating a watermarked image and a key from the combined image, the digital image decoding method comprising the step of extracting a signature image from the watermarked image using the key.

Also, to accomplish the fifth object, there is provided a digital image watermarking processor including a padding portion for padding with predetermined pixel values between the respective data in the signature image data sets such that the size of a signature image data set is the same as that of a host image data set, a first setting portion for setting the padded signature image data sets as wavelet coefficient sets of wavelet functions, a second setting portion for setting the host image data sets as scaling coefficient sets of scaling functions, and a reconstructing portion for reconstructing the wavelet coefficient sets and the scaling coefficient sets as scaling coefficient sets at one level higher than the level to which the two sets belong, in accordance with a predetermined wavelet reconstruction algorithm in which the wavelet coefficient sets and the scaling coefficient sets are linearly independently arranged.

To accomplish the sixth object, there is provided a digital image encoding apparatus comprising the digital image watermarking processor.

Also, to accomplish the seventh object, there is provided a digital image decoding apparatus for decoding an image encoded by a digital image encoding method comprising the step of performing a digital image watermarking method for performing a digital image watermarking method for combining host image data sets and signature image data sets in a predetermined combination method by which the host image data sets and the signature image data sets are linearly independently combined, and for generating a watermarked image and a key from the combined image, the digital image decoding apparatus comprising a decoder for extracting a signature image from the watermarked image using the key.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Preferred embodiments of the present invention will now be described in detail with reference to the accompanying drawings.

Figure 1:
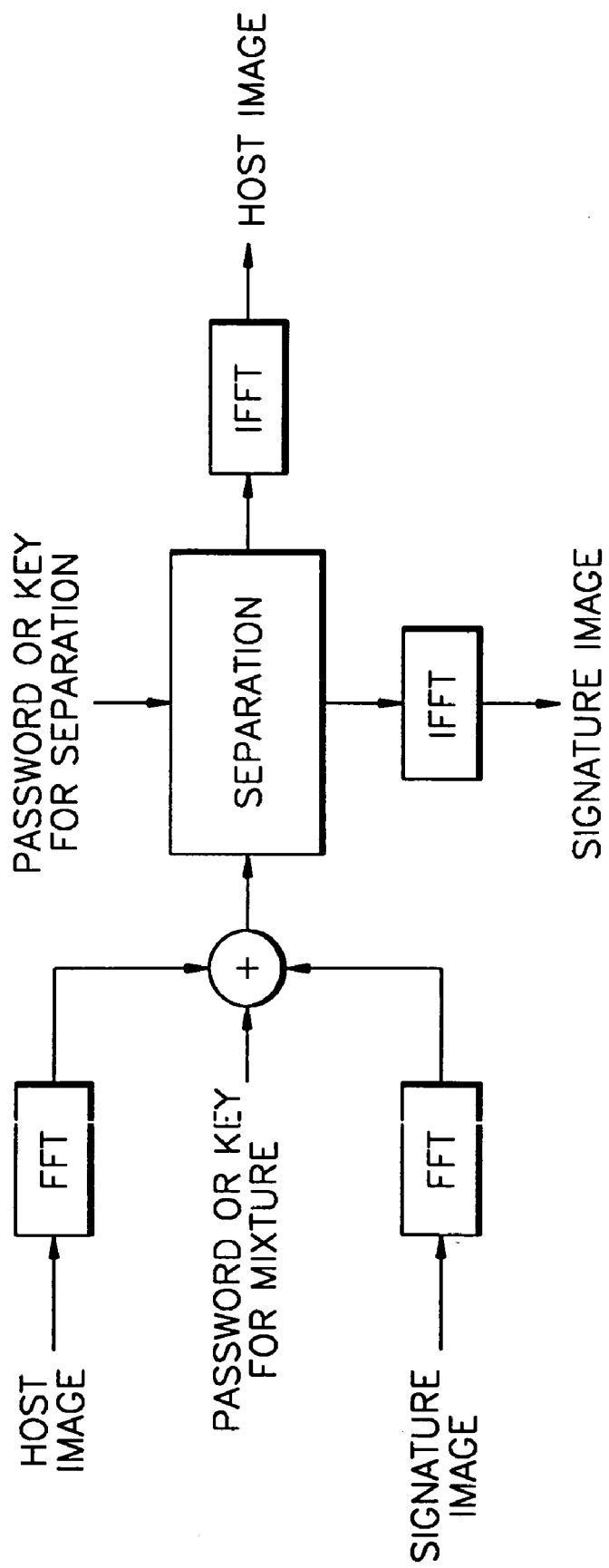
FIG. 1 is a diagram illustrating a conventional digital image watermarking method.
Figure 2:
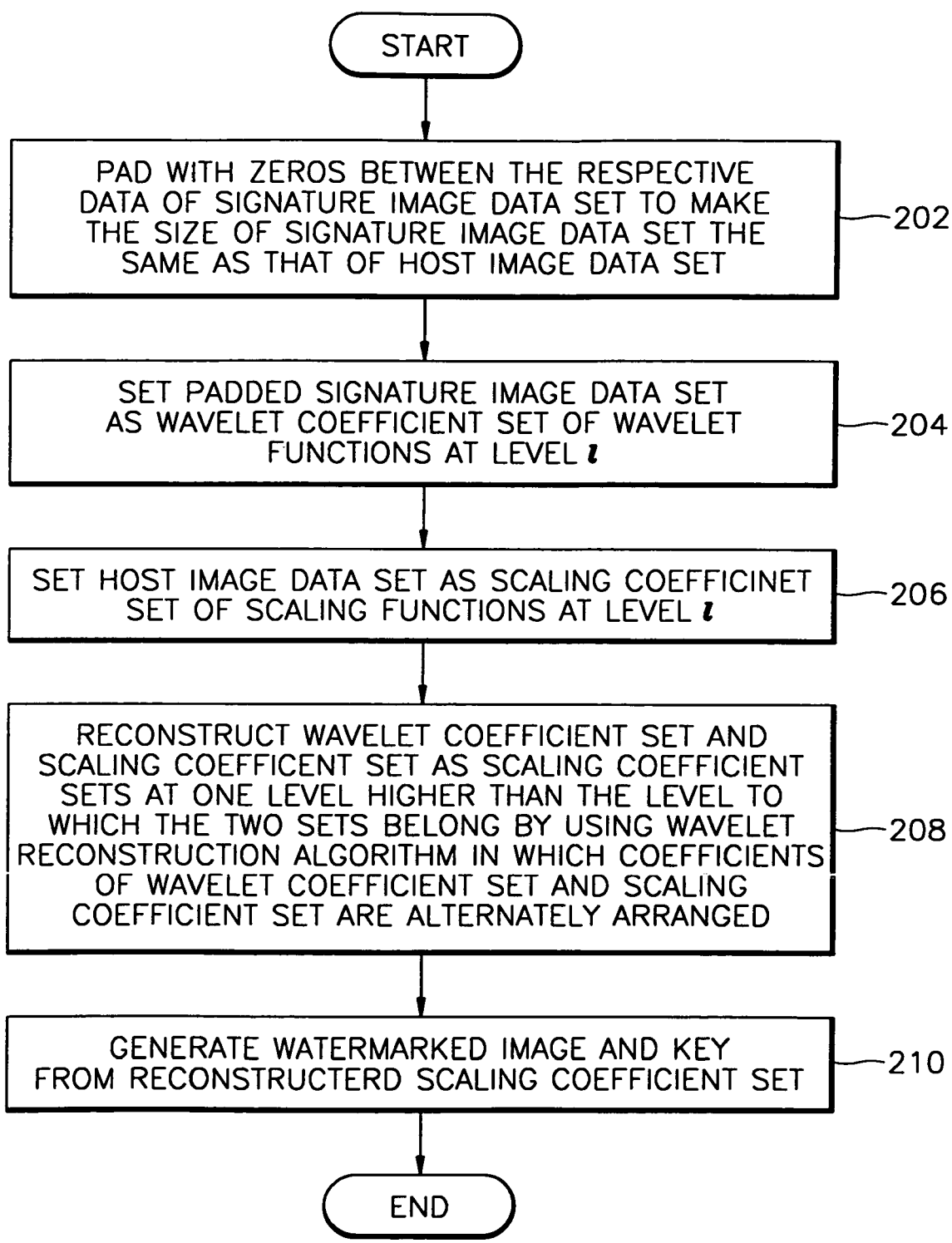
FIG. 2 is a flow diagram illustrating the major steps of a digital image watermarking method according to the present invention.

FIG. 2 is a flow diagram illustrating the major steps of a digital image watermarking method according to the present invention. A host image and a signature image each consists of a plurality of pixels. Since pixel values correspond to examples of predetermined values for color vectors of the respective pixels representing the image, the pixel values of the host image can be generalized to be referred to as a host image data set. Now, pixel values for a host image and a signature image will be referred to as a host image data set and a signature image data set, respectively.

According to the digital image watermarking method of the present invention, first, the respective data of signature image data sets are padded with zeros as pixel values, thereby making the size of a signature image data set the same as that of a host image data set (step 202).

For example, when n, l and m are independently predetermined positive integers, it is assumed that a host image consists of n pixels. Also, assuming that l represents the number of pixels of an image of the same direction, i.e., either horizontal or vertical, the amount of data in the host image data set, that is, the number of pixels of a host image, n, equals $2^l$. Also, when a signature image consists of m pixels, it is assumed that m equals 0.25×n.

Next, the padded signature image data sets are set as wavelet coefficient sets of wavelet functions at a level l (step 204). Also, the host image data sets are set as scaling coefficient sets of scaling functions at a level l (step 206).

Now, by using a wavelet reconstruction algorithm in which coefficients of the wavelet coefficient sets and coefficients of the scaling coefficient sets are alternately arranged, the wavelet coefficient sets and the scaling coefficient sets are reconstructed as scaling coefficient sets at one level higher than the level l to which these two sets belong, that is, at a level l+1 (step 208). The number of resultant coefficients equals $2^{l+1}$. Also, the wavelet coefficient sets and the scaling coefficient sets included in the scaling coefficient sets reconstructed by the wavelet reconstruction algorithm are linearly independent.

Then, a watermarked image and a key are generated from the reconstructed scaling coefficient sets (step 210). Preferably, $2^l$ coefficients are selected among $2^{l+1}$ coefficients and used as pixel values of the watermarked image. The remaining coefficients are considered as the key, together with the types of the wavelet functions used. For example, the coefficients alternately selected based on the alternate arrangement according to the reconstruction algorithm in step 208 can be used as watermarked images and the remaining coefficients can be used as keys.

For better understanding of the present invention, the watermarking method according to the present invention will now be described in more detail in the case of adopting the watermarking method in a Haar system having a simple scheme of reconstruction and decomposition for scaling and wavelet functions.

When k is a number between 1 and $2^l$ and j is a number representing a level, the scaling coefficients of scaling functions can be represented by $\{S_k^j\}$ and the wavelet coefficients of wavelet functions can be represented by $\{d_k^j\}$, as in steps 202 through 206.

The reconstruction algorithm of step 208 can be represented by the following scheme (1).

$$\{S_k^j\} \oplus \{d_k^j\} = \{S_k^{j+1}\} \quad (1)$$

In the Haar system, $\{S_k^j\}$ is decomposed into $\{S_k^{j-1}\}$ and $\{d_k^{j-1}\}$, in accordance with a predetermined decomposition algorithm, for example.

In the Haar system, the above scheme is arithmetically represented by the following equations (2) and (3).

$$s_k^{j-1} = \frac{1}{\sqrt{2}}(s_{2k-1}^j + s_{2k}^j) \quad (2)$$

$$d_k^{j-1} = \frac{1}{\sqrt{2}}(s_{2k-1}^j - s_{2k}^j) \quad (3)$$

Also, using the equations (2) and (3), the reconstruction algorithm can be represented by the following equations (4) and (5).

$$s_{2k-1}^j = \frac{1}{\sqrt{2}}\left(s_{2k}^{j-1} + d_k^{j-1}\right) \quad (4)$$

$$s_{2k}^j = \frac{1}{\sqrt{2}}\left(s_{2k}^{j-1} - d_k^{j-1}\right) \quad (5)$$

According to the above-described reconstruction algorithm, for example, $\{S_{2k-1}^j\}$ is set as a watermarked image and $\{S_{2k}^j\}$ is set as a key. Also, when a host image is $\{S_k^j\}$ and a signature image is $\{d_k^j\}$, the reconstructed image can be represented by $\{S_k^{l\pm 1}\}$, the watermarked image can be represented by $\{S_{2k-1}^{l\pm 1}\}$ and the key can be represented by $\{S_{2k}^{l\pm 1}\}$.

Now, it is possible to extract a signature image from the watermarked image using the key, which is appreciated by one skilled in the watermarking art.

As described above, according to the watermarking method of the present invention, host image data sets and signature image data sets are combined using a wavelet reconstruction algorithm so as to satisfy a linearly independent relationship therebetween. Thus, since an embedded signature image is orthogonal to the image combined therewith, perturbations of the combined image act on equally both the combined image components and the embedded signature image components that is, two orthogonal components. As a result, the degrees of distortion of the pus embedded signature image and the image combined therewith are similar to each other due to the linear independence of two images.

Therefore, according to the watermarking image of the present invention, a signature image embedded in an image combined therewith are similar to each other in view of existence and durability. Also, like in the case where a signature image is not attached, it is easy to restore the host image.

The above-described digital image watermarking method can be adopted in a digital image encoding method.

Also, an image encoded by a digital image encoding method comprising the step of performing a digital image watermarking method for combining host image data sets and signature image data sets in a predetermined combination method by which the host image data sets and the signature image data sets are linearly independently combined, and for generating a watermarked image and a key from the combined image, can be decoded by a digital image decoding method for extracting a signature image from the watermarked image.

Further, the digital image watermarking method and the digital image encoding method can be writeable by a program implemented by a PC or server computer. The program codes and code segments constituting the program can be easily inferred by computer programmers in the art. Also, the program can be stored on a computer-readable recording medium. Examples of the recording medium include a magnetic recording medium, a magneto-optical recording medium and a multimedia recording medium.

Figure 3:
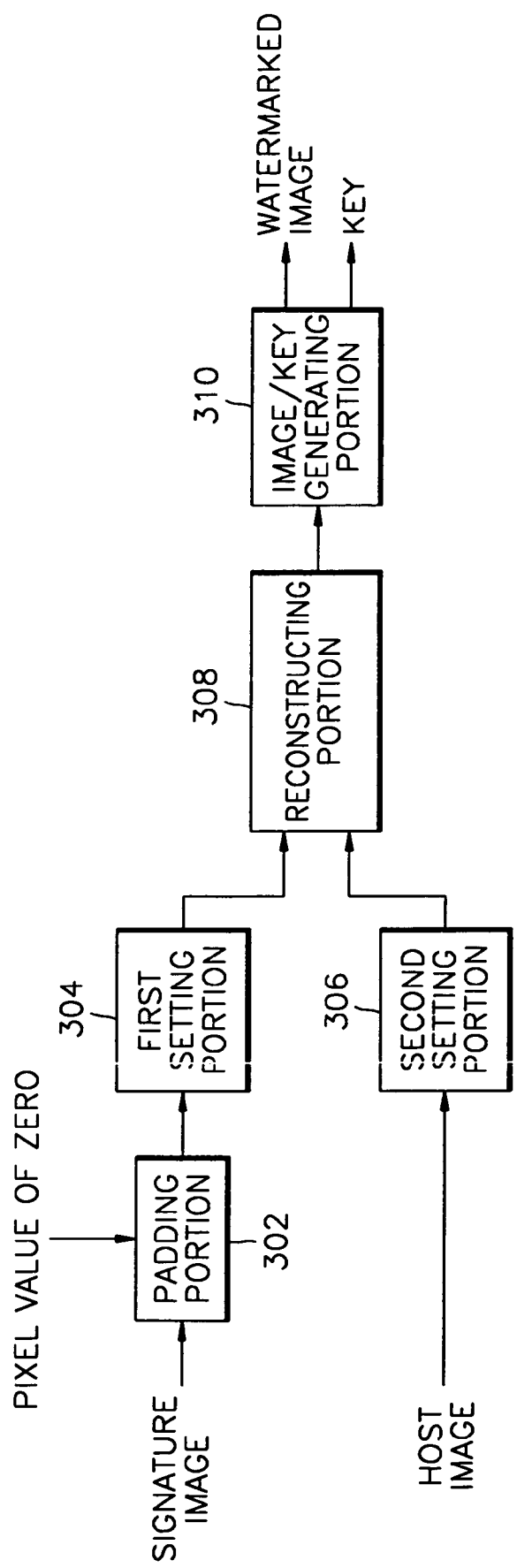
FIG. 3 is a block diagram of a digital image watermarking processor according to the present invention.

Also, the above-described digital image watermarking method can be implemented by a digital image watermarking processor. FIG. 3 is a block diagram of a digital image watermarking processor according to the present invention. Referring to FIG. 3, the digital image watermarking processor according to the present invention includes a padding portion 302, a first setting portion 304, a second setting portion 306, a reconstructing portion 308 and an image/key generating portion 310. The digital image watermarking processor is designed based on the digital image watermarking method shown in FIG. 2.

The digital image watermarking processor operates as follows. The padding portion 302 pads with zeros as pixel values between the respective data in the signature image data set such that the size of a signature image data set is the same as that of a host image data set. The first setting portion 304 sets the padded signature image data sets as wavelet coefficient sets of wavelet functions. The second setting portion 306 sets the host image data sets as scaling coefficient sets of scaling functions. The reconstructing portion 308 reconstructs the wavelet coefficient sets and the scaling coefficient sets as scaling coefficient sets at one level higher than the level to which the two sets belong, in accordance with a predetermined wavelet reconstruction algorithm in which the wavelet coefficient sets and the scaling coefficient sets are linearly independently arranged. Then, the image/key generating portion 310 generates a watermarked image and a key from the reconstructed scaling coefficient sets output from the reconstructing portion 308.

The above-described digital image watermarking processor may be included in the digital image encoding apparatus.

Also, the above-described digital image decoding method may be implemented by a digital image decoding apparatus. The digital image decoding apparatus (not shown) includes a decoder for decoding the image encoded by the digital image encoding method comprising the step of performing a digital image watermarking method for combining host image data sets and signature image data sets in a predetermined combination method by which the host image data sets and the signature image data sets are linearly independently combined, and for generating a watermarked image and a key from the combined image. The decoder extracts a signature image from the watermarked image using the key. Extraction of a signature image from the watermarked image using the key can be appreciated by one skilled in the watermarking art. Since the signature image is similar to the combined image in view of existence and durability, based on the characteristics of the watermarking method applied to encoding, the signature image can be separated from the combined image in a more stable manner.

While an alternate arrangement of wavelet coefficient sets and scaling coefficient sets there has been described and illustrated, it should be clear to those skilled in the art that variations and modifications are possible without departing from the spirit and scope of the invention as defined in the appended claims.

As described above, according to the present invention, a signature image embedded in a combined image is similar to the combined image in view of existence and durability.

What is claimed is:

1. A digital image watermarking method comprising:
    combining host image data sets and signature image data sets to be linearly independent; and
    generating a watermarked image and a key from the combined image.

2. The digital image watermarking method according to claim 1, further comprising:
    extracting a signature image from the watermarked image using the key.

3. A digital image encoding method comprising:
    a) combining host image data sets and signature image data sets to be linearly independent;
    b) generating a watermarked image and a key from the combined image; and
    c) using steps a–b to perform digital encoding.

4. A digital image encoding method according to claim 3 wherein the signature image is extracted from the watermarked image using the key.

5. A digital image watermarking method comprising:
    (a) padding between respective data in signature image data sets with pixel values such that a size of a signature image data set is same as that of a host image data set;
    (b) setting the padded signature image data sets generated in step a as wavelet coefficient sets of wavelet functions;
    (c) setting the host image data sets as scaling coefficient sets of scaling functions; and
    (d) reconstructing the wavelet coefficient sets and the scaling coefficient sets as scaling coefficient sets at one level higher than the level to which the wavelet coefficient sets and the scaling coefficient sets belong, in accordance with a wavelet reconstruction algorithm, wherein the wavelet coefficient sets and the scaling coefficient sets are linearly and independently arranged in the wavelet reconstruction algorithm.

6. The digital image watermarking method according to claim 5, wherein the pixel values are zeros.

7. The digital image watermarking method according to claim 5, wherein the wavelet reconstruction algorithm further comprises alternately arranging coefficients of the wavelet coefficient sets and coefficients of the scaling coefficient sets.

8. The digital image watermarking method according to claim 6, wherein the wavelet reconstruction algorithm further comprises alternately arranging coefficients of the wavelet coefficient sets and coefficients of the scaling coefficient sets.

9. The digital image watermarking method according to claim 5, further comprising:
    (e) generating a watermarked image and a key from scaling coefficient sets reconstructed in step d.

10. The digital image watermarking method according to claim 9, further comprising:
    (f) extracting a signature image from the watermarked image using the key.

11. A digital image encoding method comprising:
    (a) padding between respective data in signature image data sets with pixel values such that a size of a signature image data set is same as that of a host image data set;
    (b) setting the padded signature image data sets generated in step a as wavelet coefficient sets of wavelet functions;
    (c) setting the host image data sets as scaling coefficient sets of scaling functions;
    (d) reconstructing the wavelet coefficient sets and the scaling coefficient sets as scaling coefficient sets at one level higher than the level to which the wavelet coefficient sets and the scaling coefficient sets belong, in accordance with a wavelet reconstruction algorithm, wherein the wavelet coefficient sets and the scaling coefficient sets are linearly and independently arranged in the wavelet reconstruction algorithm; and
    (e) using step a–d for digital encoding.

12. A digital image encoding method according to claim 11 wherein the pixel values are zeros.

13. A digital image encoding method according to claim 11 wherein the wavelet reconstruction algorithm further comprises alternately arranging coefficients of the wavelet coefficient sets and coefficients of the scaling coefficient sets.

14. A digital image encoding method according to claim 12 wherein the wavelet reconstruction algorithm further comprises alternately arranging coefficients of the wavelet coefficient sets and coefficients of the scaling coefficient sets.

15. A digital image encoding method according to claim 11 wherein watermarked image and a key are generated from scaling coefficient sets reconstructed in step d.

16. A computer-readable recording medium comprising computer readable instruction to enable a computer to perform digital image watermarking using at least following steps:
    (a) padding between respective data in signature image data sets with pixel values such that a size of a signature image data set is same as that of a host image data set;
    (b) setting the padded signature image data sets generated in step a as wavelet coefficient sets of wavelet functions;
    (c) setting the host image data sets as scaling coefficient sets of scaling functions; and
    (d) reconstructing the wavelet coefficient sets and the scaling coefficient sets as scaling coefficient sets at one level higher than the level to which the wavelet coefficient sets and the scaling coefficient sets belong, in accordance with a wavelet reconstruction algorithm, wherein the wavelet coefficient sets and the scaling coefficient sets are linearly and independently arranged in the wavelet reconstruction algorithm.

17. The computer-readable recording medium according to claim 16, wherein the pixel values are zeros.

18. The computer-readable recording medium according to claim 16, wherein the wavelet reconstruction algorithm further comprises alternately arranging coefficients of the wavelet coefficient sets and coefficients of the scaling coefficient sets.

19. The computer-readable recording medium according to claim 17, wherein the wavelet reconstruction algorithm further comprises alternately arranging coefficients of the wavelet coefficient sets and coefficients of the scaling coefficient sets.

20. The computer-readable recording medium according to claim 16, further comprising:
    (e) generating a watermarked image and a key from scaling coefficient sets reconstructed in step d.

21. The computer-readable recording medium according to claim 20, further comprising:
(f) extracting a signature image from the watermarked image using the key.

22. A digital image decoding method for decoding an image encoded by a digital image encoding technique comprising:
using a digital image watermarking technique for combining host image data sets and signature image data sets;
using a combination technique by which the host image data sets and the signature image data sets are linearly and independently combined; and
generating a watermarked image and a key from the combined image, the digital image decoding technique further comprising:
extracting a signature image from the watermarked image using the key.

23. A digital image watermarking processor comprising:
a padding portion to pad between respective data in signature image data sets with pixel values such that a size of a signature image data set is same as that of a host image data set;
a first setting portion to set padded signature image data sets generated by the padding portion as wavelet coefficient sets of wavelet functions;
a second setting portion to set the host image data sets as scaling coefficient sets of scaling functions; and
a reconstructing portion to reconstruct the wavelet coefficient sets and the scaling coefficient sets as scaling coefficient sets at one level higher than the level to which the wavelet coefficient sets and the scaling coefficient sets belong, in accordance with a wavelet reconstruction algorithm in which the wavelet coefficient sets and the scaling coefficient sets are linearly and independently arranged.

24. The digital image watermarking processor according to claim 23, wherein the pixel values are zeros.

25. The digital image watermarking processor according to claim 23, wherein the wavelet reconstruction algorithm comprises alternately arranging coefficients of the wavelet coefficient sets and coefficients of the scaling coefficient sets.

26. The digital image watermarking processor according to claim 24, wherein the wavelet reconstruction algorithm comprises alternately arranging coefficients of the wavelet coefficient sets and coefficients of the scaling coefficient sets.

27. The digital image watermarking processor according to claim 23, further comprising
a generating portion to generate a watermarked image and a key from the reconstructed scaling coefficient sets.

28. The digital image watermarking processor according to claim 27, further comprising an extracting portion to extract a signature image from the watermarked image using the key.

29. A digital image encoding apparatus comprising:
a padding portion to pad between respective data in signature image data sets with pixel values such that a size of a signature image data set is same as that of a host image data set;
a first setting portion to set padded signature image data sets generated by the padding portion as wavelet coefficient sets of wavelet functions;
a second setting portion to set the host image data sets as scaling coefficient sets of scaling functions; and
a reconstructing portion to reconstruct the wavelet coefficient sets and the scaling coefficient sets as scaling coefficient sets at one level higher than the level to which the wavelet coefficient sets and the scaling coefficient sets belong, in accordance with a wavelet reconstruction algorithm in which the wavelet coefficient sets and the scaling coefficient sets are linearly and independently arranged.

30. A digital image encoding apparatus according to claim 29 wherein the pixel values are zeros.

31. A digital image encoding apparatus according to claim 29 wherein the wavelet reconstruction algorithm comprises alternately arranging coefficients of the wavelet coefficient sets and coefficients of the scaling coefficient sets.

32. A digital image encoding apparatus according to claim 30 wherein the wavelet reconstruction algorithm comprises alternately arranging coefficients of the wavelet coefficient sets and coefficients of the scaling coefficient sets.

33. A digital image encoding apparatus according to claim 29 further comprising:
a generating portion to generate a watermarked image and a key from the reconstructed scaling coefficient sets.

34. A digital image encoding apparatus according to claim 29 further comprising:
an extracting portion to extract a signature image from the watermarked image using the key.

35. A digital image decoding apparatus for decoding an image encoded by a digital image encoding technique comprising:
a digital watermarking portion to perform digital image watermarking for combining host image data sets and signature image data sets;
a combination portion to perform a combination technique by which the host image data sets and the signature image data sets are linearly independently combined;
an image generating portion to generate a watermarked image and a key from the combined image, and
a decoder for extracting a signature image from the watermarked image using the key.

* * * * *